Nov. 29, 1932.  I. MARKS  1,889,149
PROJECTION LIGHT INTENSITY CONTROL MECHANISM
Filed Nov. 23, 1931  3 Sheets-Sheet 1
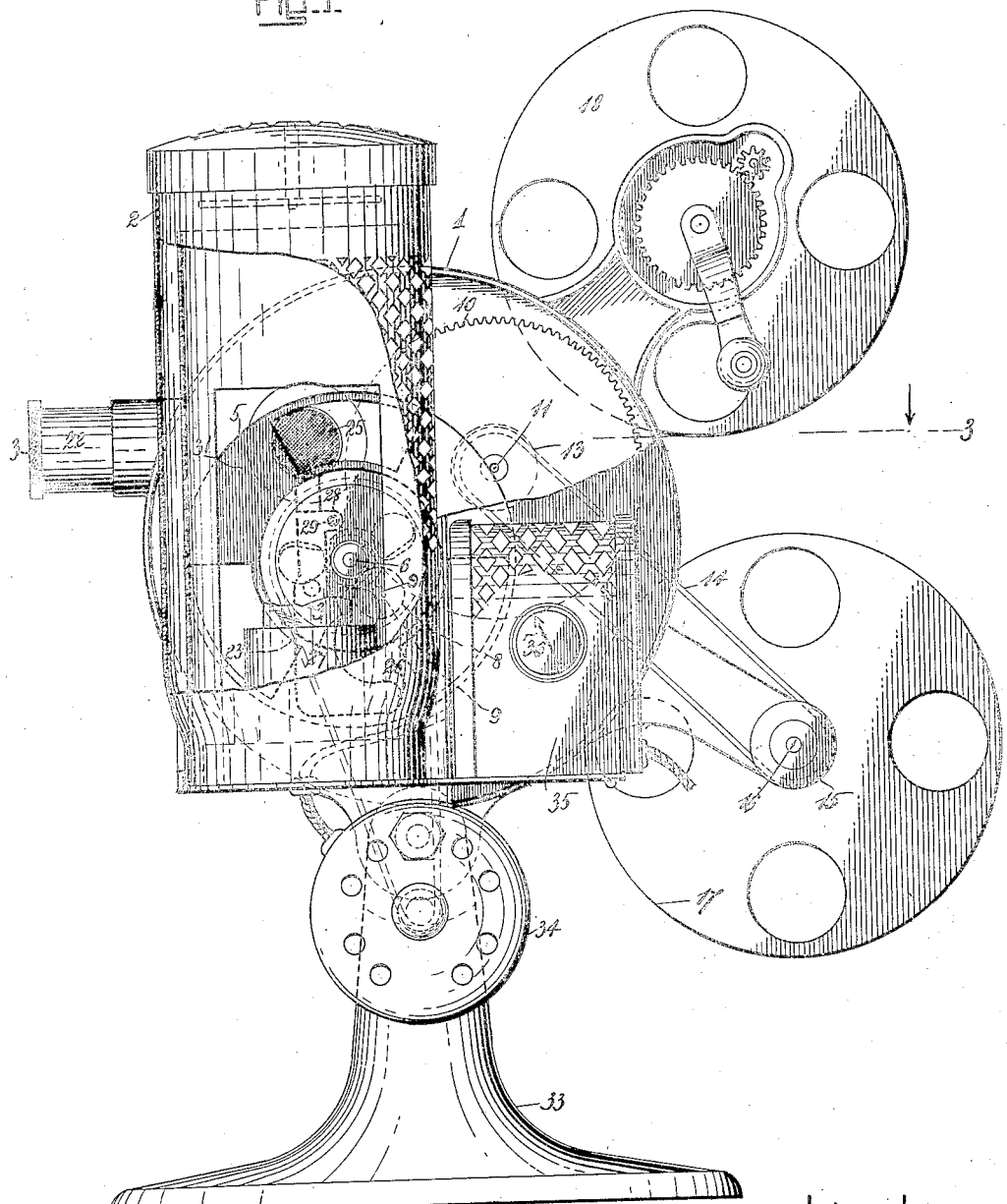

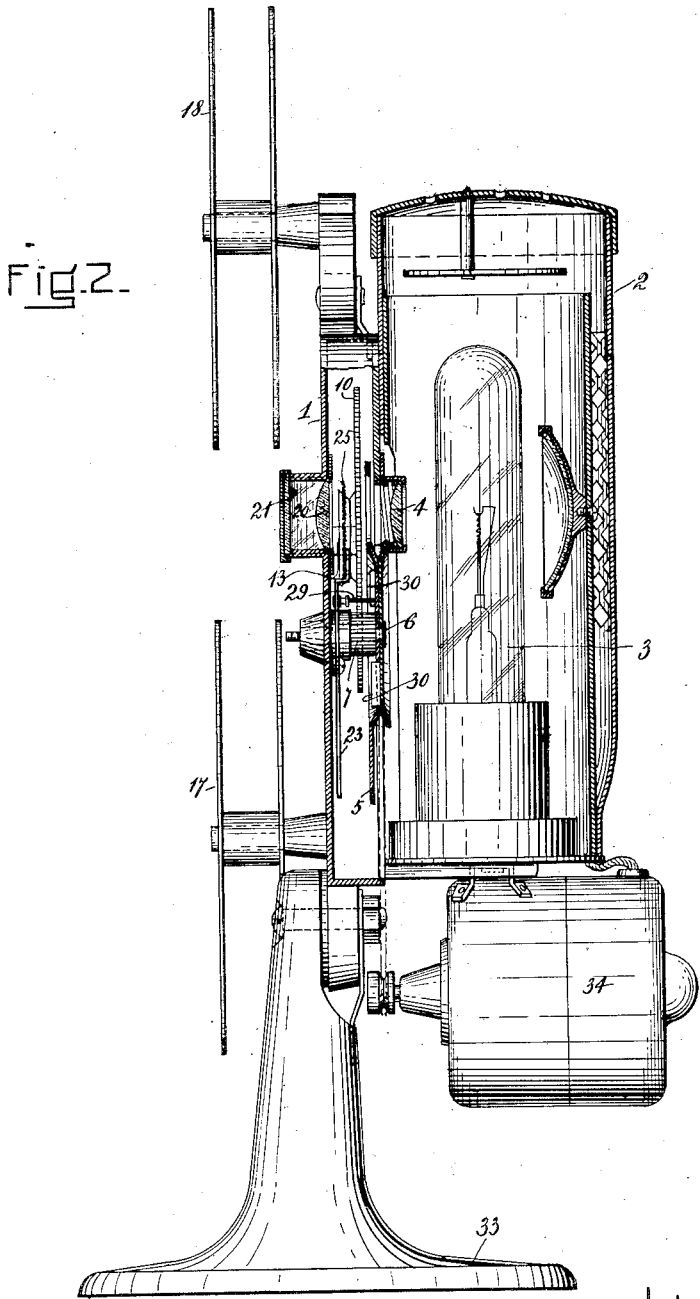

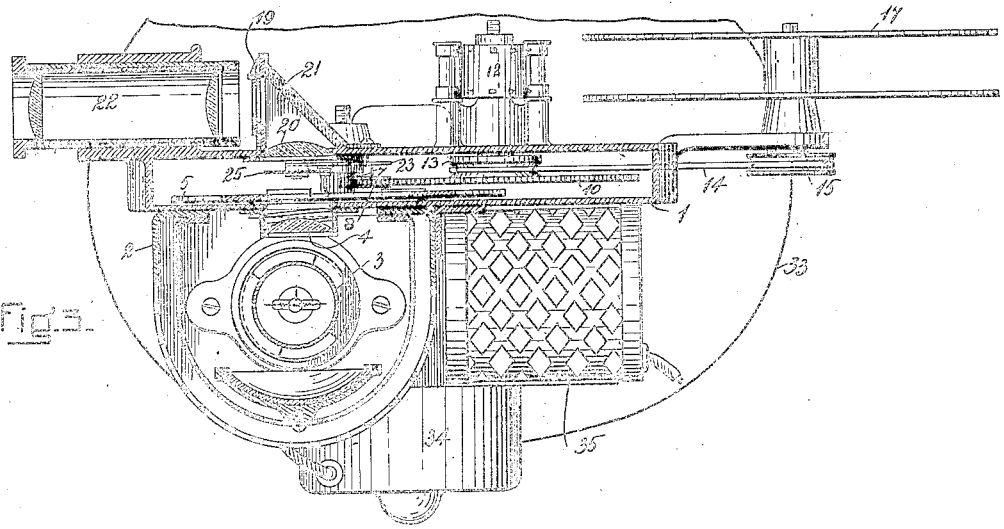
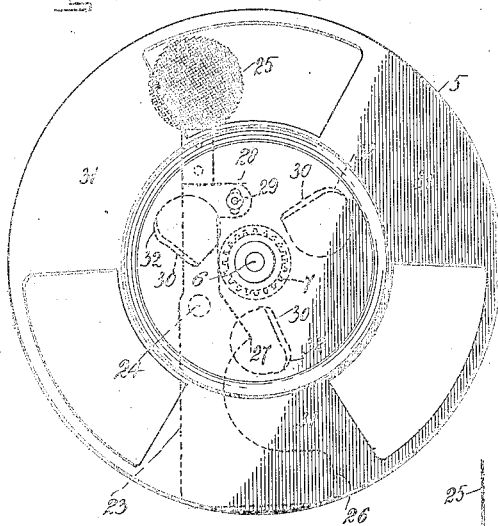
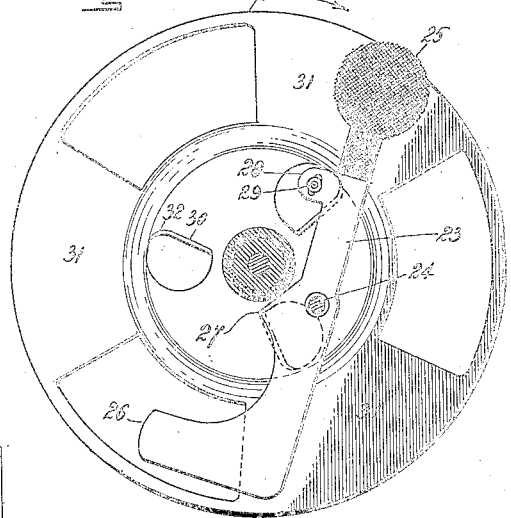
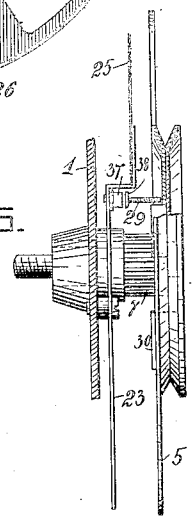
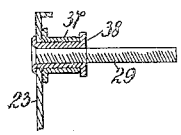

Patented Nov. 29, 1932                    1,889,149

UNITED STATES PATENT OFFICE

ISIDORE MARKS, OF BOSTON, MASSACHUSETTS, ASSIGNOR TO KEYSTONE MFG. CO., OF BOSTON, MASSACHUSETTS

PROJECTION LIGHT INTENSITY CONTROL MECHANISM

Application filed November 23, 1931. Serial No. 576,779.

This invention relates to improvements in a motion picture projector and more particularly to a light controlling mechanism which automatically decreases the intensity of light, focused by the condensing lens, onto the film in the film gate when the projector is not being operated to feed the film strip forward, but which allows the full intensity of the light to strike the film when said film strip is being fed forward at even a fairly slow rate of speed.

When a bright light is focused sharply on a motion picture film strip as in a projector, the film will be burned or blistered if allowed to remain stationary for even a few seconds. In usual practice, where 16 pictures a second are projected, the film is stationary only about 1/20 of one second and the light is cut off by the shutter during part of this period so there is no danger of burning unless excessive light is used.

The picture may be focused more sharply on the screen, if this focusing is done while the film is stationary in the film gate. It is also found desirable at times to project still pictures, especially with the amateur or home projector, where the scenes are usually short and it is desired to study an especially interesting portion by stopping the projector with the shutter open. To prevent injury to the film in such cases, is the object of this invention.

To accomplish this, there is provided a dimmer arm of light weight, pivoted on the body of the projector and having a wire-screen, mesh at one end, which under the action of gravity, tends to cover an opening through which the light passes from the light source to the film in the film gate. There is a flexible projection on the side of the dimmer arm which is engaged by projections on the usual multiple blade shutter, located just back of the dimmer arm, and between it and the light source. The projections on the shutter are located so that they strike the projection on the dimmer arm, just as the shutter blade has cut off the light to the film, a1d the wire screen is pushed out of the path of the light. As the shutter is closed, no light passes to the film. As the shutter continues to revolve and just before the shutter blade allows the light to pass, the projection on the dimmer arm slips off the projection on the shutter and due to gravity the wire screen falls in front of the opening through which the light passes and obstructs a portion, causing less light to fall upon the film.

There is a certain amount of time required for the wire mesh to fall and it is found that even when the shutter is rotated at a comparatively slow rate of speed, before the wire mesh begins to obstruct the light, the following projection on the shutter, strikes the projection on the dimmer arm and the wire mesh is prevented from falling.

Thus, if the shutter is rotated as in regular projection, the light is not obstructed but falls with full intensity on the film. If the shutter is stopped with the blades in position to let the light pass, the dimmer screen falls into the path of the light, dimming the light on the film. Since in regular projection, the shutter periodically intercepts the light, the still picture will appear on the screen as bright as the moving picture.

A metal blade with a few comparatively large holes would cause the same effect of dimming, but when using the projector at comparatively short distances from the screen, shadows from the dimmer would appear.

A large number of evenly separated small holes, such as are in a fine wire mesh, cause an evenly illuminated screen. It is obvious that other light obstructing material, such as mica or other material could be used. Lamps of different intensity require wire mesh of different spacing of wires for best results.

Since the shutter revolves at a high rate of speed, its projections continuously hit the flexible projection on the dimmer arm, but due to the flexibility of this projection and the light weight of the arm, the action is practically noiseless and the arm remains comparatively stationary in a tilting position.

A more particular description of the invention is as follows:

In the accompanying drawings:

Figure 1 represents a back elevation of a projector, embodying this invention, with a portion of the lamp house, lamp and shutter, cut away to show the light intensity control mechanism.

Figure 2 is a side elevation, partly in section, showing a side view of the above mechanism.

Figure 3 is a section of Figure 1, on line 3—3.

Figure 4 is a back view of the shutter, showing the control mechanism arm in dotted lines with the obstructing screen in the path of the light.

Figure 5 is a front view of the shutter, showing the control mechanism in elevation when the obstructing screen is pushed out of the path of the light.

Figure 6 is a side view of the shutter, partly in section, showing control mechanism in side elevation.

Figure 7 is an enlarged view showing the means of fastening of flexible projection to the control mechanism arm.

Similar reference numerals indicate like parts in the several views.

Referring to the drawings, "1" is the projector body on which is mounted the various parts of the projector. "2" is the lamp house, containing a projection lamp "3" and condensing lens "4". The shutter "5" is mounted on shaft "6", on which is also fastened the cam which drives the intermittent film feeding mechanism and a pinion "7" meshing with an idler gear "8" on pivot "9". This idler meshes with the large gear "10" on shaft "11". On the other end of shaft "11" is the continuous feed sprocket "12". The large gear "10", has fast to it the lower reel drive pulley "13" which through take-up belt "14" drives the take-up pulley "15" on shaft "16", on which is the lower reel "17". The upper reel "18" supplies the film to the continuous feed sprocket "12", which delivers the film to the film gate "19" and intermittent feeding mechanism.

The light beam is projected from the projection lamp "3" through a condensing lens "4", past the shutter "5" through a second condensing lens "20" to a mirror "21", which reflects the light at right angles through the aperture and film in the film gate "19", to the projection lens "22", and from thence to the screen.

Between the shutter "5" and the second condensing lens "20" is the dimmer arm "23", pivoted on the body at "24" with a wire mesh screen "25" at its upper end. The lower end of "23" has an extension "26", so that due to the force of gravity the screen "25" is forced to the right, as looked at from the lamp house side. This movement is arrested when the screen is in alignment with the second condenser "20" by the side of the dimmer arm striking a projecting hub on the body "1". When the screen "25", is forced to the left out of alignment with condenser "20" and the beam of light, its movement is arrested by the projection "27" on the dimmer arm striking the under side of said hub. At "28" on the dimmer arm is attached a flexible projection "29", composed of a coil of fine wire. This coil is fastened end-ways to the dimmer arm by two hollow rivets. The outer rivet "37" acts as a spacer. The inner rivet "38" passes through this and the arm and is riveted to the arm. The coil is pushed through the inner rivet and the sides of both rivets are squeezed tightly against the coil "29". The three blade shutter "5" has three cam shaped projections "30", which are in such position with the shutter openings that just as a shutter blade has cut off the light from condenser "20", a projection "30" strikes the projecting coil "29" and forces screen "25" out of the path of the light. As the shutter revolves to the left and just before the blade "31" allows the light to pass to condenser "20", the coil "29" slips by the end "32" of the projection "30" and due to gravity the screen "25" is swung back into the beam of light. "33" is the base of the machine, "34" is a motor to drive it, "35" is a rheostat housing in which is the rheostat with control knob "36".

Having thus described the invention, what I claim as new and desire to secure by Letters Patent is:

1. In a motion picture machine, the combination of supply and take-up reels, a continuous feed sprocket, an intermittent film feeding mechanism, a film guide with aperture opening, in alignment with a projection lens and light source, a rotatable shutter, which intermittently cuts off the light from said light source to said aperture and a light intensity control mechanism, adjacent to said shutter, having a pivotally mounted arm, carrying a light obstructing member of fine wire mesh, held by gravity, in the path of said light and operated automatically to control the intensity of light falling from said light source on said aperture, by cam shaped projections on said shutter engaging a flexible projection on said arm, all substantially as described.

2. In a motion picture machine, the combination of supply and take-up reels, a continuous feed sprocket, an intermittent film feeding mechanism, a film guide with aperture opening, in alignment with a projection lens, and light source, a rotatable shutter and a light intensity control mechanism, to diminish the intensity of light passing said shutter, when not rotating, operated by, and in synchronism with the openings of, said shutter, by projections on the side of said shutter engaging the end of a flexible projection on said light intensity control mechanism, composed of a small coil of fine wire, one end of which is inserted into a hollow rivet, which is passed through a second slightly larger hollow rivet, to act as a spacer, the first rivet, then being riveted to a member of the control mechanism and the sides of the rivets tightly pressed to the wire coil, all substantially as described.

3. In a motion picture machine, a combination of supply and take-up reels, a continuous feed sprocket, an intermittent film feeding mechanism, a film guide with aperture opening, in alignment with a projection lens and light source, a rotatable shutter, intermittently, intercepting said light, and a light intensity control mechanism, composed of a light weight, partially balanced, pivoted arm, having a light obstructing screen at its upper end, held by gravity, in the path of the light from shutter to aperture opening, and easily moved out of said path by projections on and in synchronism with the blades of said shutter, consecutively striking a shock absorbing, flexible projection on said arm, all substantially as described.

ISIDORE MARKS.